Figure 3:
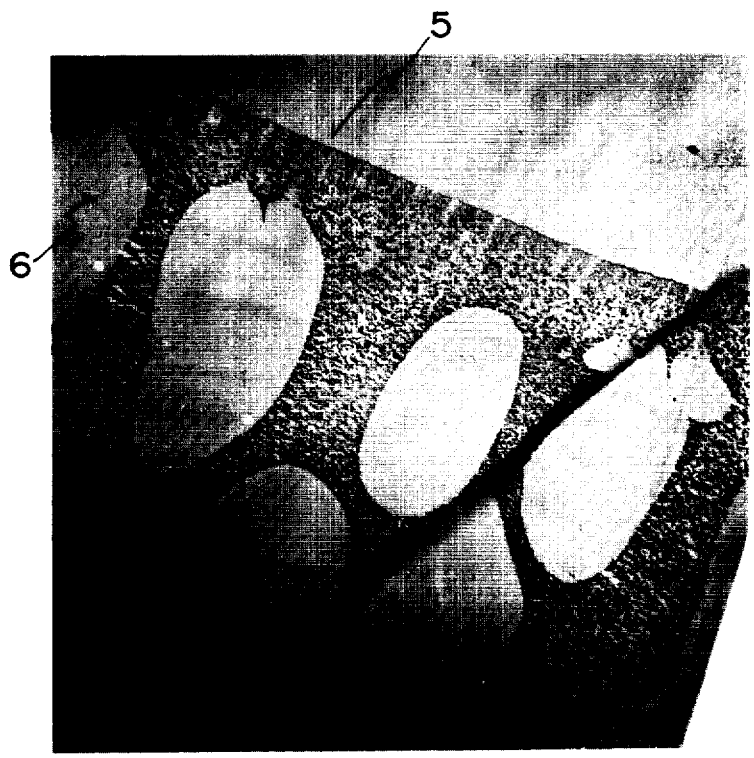

United States Patent [19]
Hashino et al.

[11] 3,933,653
[45] Jan. 20, 1976

[54] MEMBRANES OF ACRYLONITRILE POLYMERS FOR ULTRAFILTER AND METHOD FOR PRODUCING THE SAME

[75] Inventors: Yasuo Hashino, Matsudoshi; Masatsugu Yoshino; Hitoshi Sawabu, both of Tokyo; Sukeo Kawashima, Osaka, all of Japan

[73] Assignee: Asahi Kasei Kogyo Kabushiki Kaisha, Osaka, Japan

[22] Filed: Apr. 26, 1973

[21] Appl. No.: 354,786

[30] Foreign Application Priority Data
Apr. 28, 1972  Japan................ 47-42751

[52] U.S. Cl................ 210/500 M; 264/41
[51] Int. Cl.²................ B01D 31/00; B01D 13/00
[58] Field of Search ........... 210/22, 23, 321, 500; 264/41, 182; 55/16; 161/178

[56] References Cited
UNITED STATES PATENTS

| | | | |
|---|---|---|---|
| 2,907,096 | 10/1954 | Halbig............... | 264/41 X |
| 3,615,024 | 10/1971 | Michaels............ | 210/490 |
| 3,616,607 | 11/1971 | Klass et al......... | 55/16 |

Primary Examiner—Frank A. Spear, Jr.
Attorney, Agent, or Firm—Armstrong, Nikaido & Wegner

[57] ABSTRACT

Membranes of acrylonitrile polymers having water-permeability greater than 0.2 ml/cm².min.atm and useful as an inexpensive superior ultrafilter, comprising (1) a porous layer or layers existing near and on the surfaces of said membranes, the average sizes of pores contained in said porous layer or layers and existing on each of assumptive parallel planes to the surfaces of said membranes, having such a gradient that said average sizes become smaller toward the surfaces of said membranes, and (2) a reticulate porous layer adjacent to said porous layer or layers (1) and containing therein a succession of voids of cylindrical shape or revolving ellipsoid shape having diameters of 5 – 50μ and lengths of at least 10μ, are prepared by dissolving an acrylonitrile polymer in an aqueous solution of nitric acid of 65 – 95% by weight concentration, casting the resulting solution on a support followed by coagulation in a coagulation bath, or extruding the resulting solution from a slit into a coagulation bath, the coagulation bath being water alone or a nitric acid aqueous solution of 30% by weight or less.

6 Claims, 4 Drawing Figures

FIG. 1    (78 TIMES)

FIG. 1 (78 TIMES)
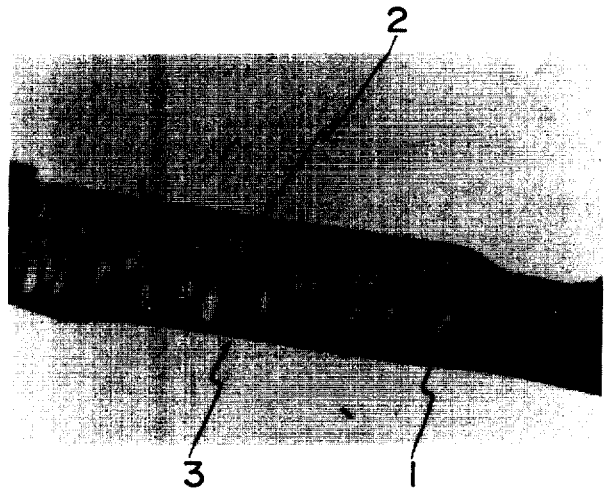
FIG. 2 (78 TIMES)
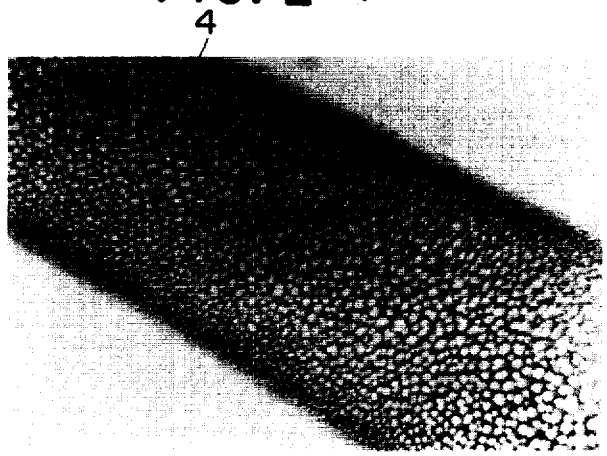

(2,500 TIMES)

(12,500 TIMES)

MEMBRANES OF ACRYLONITRILE POLYMERS FOR ULTRAFILTER AND METHOD FOR PRODUCING THE SAME

DESCRIPTION OF THE INVENTION

The present invention relates to membranes of acrylonitrile polymers for ultrafilter and a method for producing the same. More particularly, it relates to a high performance membranes of acrylonitrile polymers for ultrafilter having a large water-permeability, in which size of pore are extremely small and distribution of size is narrow and the method for producing the same. An object of the present invention is to provide novel membranes for ultrafilter having a large water-permeability being capable of affording a high filtration rate; hardly causing the clogging of pores and hence, enabling to carry out continuous filtration operation for a long period of time with the same material. Another object of the present invention is to provide membranes for ultrafilter having a large mechanical strength, a high chemical stability, has a superior resistance to microorganisms hence microbially almost incorruptible; which are useful in various commercial separation process.

For separating bacteria, proteins, viruses, colloidal substances, etc. by filtration, collodion membrance, gel cellophane film, etc. have been heretofore used. Recently, however, in place of these conventional ultrafilters, cellulose acetate membrane, collagen membrane, dextran membrane, etc. have been newly commercialized, and broad application thereof have been developed in such fields as food industry, pharmaceutical industry, electronic industry, prevention of public nuisance, etc. in addition to those of laboratory scale. However, these conventional filters which have been heretofore used have various drawbacks such as low water-permeability, a considerably high pressure necessary at the time of filtration operation, necessity of exchange of filter within a short period of time due to clogging, etc. Further, ultrafilters of cellulosic membranes which have been mostly used are liable to undergo degradation due to hydrolysis as well as corruption due to microbial action, and moreover their resistance to chemicals is not good.

Recently, studies on methods for producing ultrafilters have been advanced, and methods for producing films having pores of smaller sizes and a larger water-permeability have been proposed.

As one of them there is a method in which solvent within the surface of film is positively vaporized at the time of film-making to form a layer of dense structure on one side of film and remaining about $100\mu$ layer of a porous structure. Thus the aim for overcoming the disadvantage of the conventional film has been achieved to a certain extent by this method. According to U.S. Pat. No. 3,567,810 which uses the above-mentioned method, polysulfone, polyacrylonitrile or the like are dissolved in a mixed solvent of dimethylsulfoxide and acetone or N,N-dimethylacetamide and acetone and made into film, but at the time of film-making, the solvent within the surface of film is vaporized, for example, by exposing the film to an air current having a temperature of 90° – 150°C, for a few seconds, and then the resulting film is dipped in a coagulation bath to obtain a film having dense struction in part close to the surface.

The water-permeability of the films thus prepared is improved compared with conventional products, but it is still low, e.g. as low as 0.31 – 0.086 ml/cm².min.atm. U.S. Pat. No. 2,846,727 also discloses a similar method, but it can afford only a same extent of water-permeability.

As the result of studies carried out by us in order to overcome the above-mentioned drawbacks of conventional ultrafilter, particularly improvement in water-permeability, ultrafilters have been prepared from acrylonitrile polymers, which show excellent performances as filtration material, i.e. a much greater water-permeability than the conventional products, a large mechanical strength, few clogging and capability of performing continuous filtration operation for a long period of time with the same material, a high chemical stability and a superior resistance to microorganisms.

The conventional microfilters have been prepared by perforating as many uniform pores as possible through a base material, and the passages of solvent in the microfilters are limited only to the pores. Accordingly, in order to increase the filtration rate, it is necessary to enlarge the diameters of the pores up to a limitation diameter which hinders passage of particles. However, even when the diameters of the pores are enlarged, clogging of pores is still liable to occur, since particles and the diameters of the pores both have a range of distribution to a certain extent.

An idea then occurred to us that a microfilter which gives a higher filtration rate without accompaniment of liability of clogging may be obtained by a structure in which an average pore diameter is made sufficiently small but the number of pores is made sufficiently larger and the basic material also can pass water. This structure is quite contrary to conventional one in which filtration is carried out only through the pores in the basic material but the basic material itself does not pass water at all.

As a means for the embodiment of such an idea one may propose a film having a water-containing gel-like structure, but, polymers gel-like structure, generally form a so-called jelly whose strength is not sufficiently high to make a membrane usable as filter. (The term "gel-like" referred to herein means a water content of at least 50% based upon volume ratio.)

Thus, it is a general phenomenon that the increase in water-permeability reduces mechanical strength while the increase in mechanical strength reduces water-permeability. In such a situation, we have succeeded in making two inconsistent characteristic properties consistent as hereinafter described.

As for polymers having a gel-like structure, water-soluble polymers, their copolymers or their cross-linked polymers have been known, but they are mechanically weak in the presence of water and cannot be used as filter even when they are shaped into a film. Thus, we have made a search for materials having a water-containing gel-like structure from among hydrophobic high molecular weight polymers and a method for forming the same. This may apparently be in inconsistent direction for the approach to a film having a water-containing gel-like structure.

In order to give a water-containing gel-like structure, it is necessary that the principal chain or the side chain of the polymers has an affinity with water, and when the affinity of the molecular chain with water is strong, water molecules are coordinated with the chain over the whole length of the molecular chain to form a gel structure having a high water-content. However, if its affinity with water is too strong, the polymers are completely dissolved in water, or even when undissolved, they swell, giving only a film having a poor mechanical strength as above-mentioned. Thus, in order to obtain a microfilter having a high water-content, in other words, a high water-permeability, and yet a large mechanical strength, it is an important keypoint to select a material having an optimum hydrophylic or hydrophobic property.

As for a parameter for expressing the affinity between substances, SP value (solubility parameter) has been often employed. The following Table 1 shows SP values of various kinds of insoluble polymers. The SP value of water is so high as 23.41.

Table 1

| SP values of various kinds of water - insoluble polymers | |
|---|---|
| Polytetrafluoroethylene | 6.2 |
| Polydimethylsiloxane (silicone rubber) | 7.3 |
| Butyl rubber | 7.7 |
| Polypropylene | 7.9 |
| Polyethylene | 7.9 |
| Natural rubber | 8.0 |
| Polyisobutylene | 8.0 |
| Polybutadine | 8.5 |
| Polybutyl acrylate | 8.8 |
| Polystyrene | 9.1 |
| Polysulfide (thiokol rubber) | 9.2 |
| Polymethyl methacrylate | 9.2 |
| Neoprene | 9.3 |
| Polybutadiene-acrylonitrile (75:25) | 9.4 |
| Polyvinyl acetate | 9.4 |
| Polyethyl acrylate | 9.4 |
| Polyvinyl chloride | 9.5 |
| Polyurethane | 10.0 |
| Epoxy resin | 10.1 |
| Ethylcellulose | 10.3 |
| Polyethylene terephthalate | 10.7 |
| Cellulose diacetate | 10.9 |
| Cellulose dinitrate | 11.0 |
| Polymethylene oxide | 11.0 |
| Phenol resin | 11.0 |
| Polyvinylidene chloride | 12.2 |
| Nylon | 13.0 |
| Polymethacrylonitrile | 15.0 |
| Polyacrylonitrile | 15.4 |

As seen in the above-described Table 1, among waterinsoluble polymers, the SP value of polyacrylonitrile, i.e., 15.4, is highest and close to the value of water, 23.41. Thus, it can be concluded that polyacrylonitrile is most suitable as the base material for preparing a microfilter having a high water-content and a large mechanical strength.

With regard to sheets or films consisting mainly of polyacrylonitrile, it has been known that they generally show extremely low gas-, and steam- and water-permeabilities as compared to those of other polymers, and by utilizing such low permeabilities, various studies have been made with regard to the development of these materials as packaging materials for preserving fragrance or moisture. Also, by utilizing the characteristics of such low gassteam- and water-permeabilities, application of bottles shaped from acrylonitrile polymers, for beer or refreshment drink is now being investigated in earnest, and it is said that if only the problem of discarding the waste of bottles is solved, they will be substituted for glass bottles. This fact evidences that the articles shaped according to a conventional process have low gas-, steam- and water-permeabilities and also a low water-absorptivity, and are extremely excellent in the point of overall resistance to water. Further, they are also superior in resistance to microorganisms and to various chemicals.

We have found also that in spite of their superiority in resistance to water, polyacrylonitrile has a small contact angle which is a parameter for expressing wettability to water, i.e. so-called wettable property, among those of general hydrophobic high molecular weight polymer materials, as shown in the following Table 2:

Table 2

| Contact angles of various polymers | |
|---|---|
| Polyacrylonitrile | 49 |
| Nylon-6 | 52 |
| N-methoxymethyl-polyamide | 52 |
| Polymethyl acrylate | 52 |
| Cellulose diacetate | 53 |
| Polycarbonate | 56 |
| Polyvinyl acetate | 57 |
| Melamine-coated plate | 58 |
| Vinylon (aldehyde-treated PVA) | 61 |
| Polymethyl methacrylate | 62 |
| Phenol resin | 63 |
| Cellulose triacetate | 67 |
| Polyvinyl chloride | 68 |
| Chlorinated rubber | 68 |
| Polyethylene terephthalate | 69 |
| Polytrifluorochloroethylene | 72 |
| Neoprene | 73 |
| Low pressure process polyethylene | 73 |
| High pressure process polyethylene | 81 |
| Polystyrene | 84 |
| Silicone rubber | 90 |
| Polypropyrene | 91 |
| Polytetrafluoroethylene | 104 |

Note: The value for polyacrylonitrile was observed this time. Other values were cited from "Handbook of materials and their water contents" edited by Kōbunshi Gakkai, Japan, Kyoritsu Publishing Co. Ltd., 1968.

From the viewpoint that if a filtration film can be prepared from such a water-wettable material, the resulting film would be extremely excellent in stability, we have investigated a method for forming a body of a fine structure which gives a large water-permeability to polyacrylonitrile, and finally succeeded in preparing an ultrafilter from a starting material of polyacrylonitrile, having a large water-permeability and a uniform distribution of pore diameters. As for a method for preparing an ultrafilter from copolymers of acrylonitrile as a raw material, a brief explanation has already been made referring to U.S. Pat. No. 3,567,810. Even when a dense structure is positively formed on the surface part of film by using an organic solvent, then promoting the vaporization of the solvent on the surface part of film, then dipping the resultant film in a coagulation bath, and controlling the diameters of pores by the resulting dense layer, only a product having a poor water-permeability can be obtained due to the presence of the dense layer.

As the result of earnest attempt to find out a method for preparing films having a uniform gel structure without forming such a particularly dense layer as mentioned above, but having fully controlled diameters of pores, an ultrafilter has been prepared by the use of nitric acid as an inorganic solvent, whose water-permeability is by one order greater than those of the films shaped by the use of an organic solvent, and yet whose distribution of pore diameters is narrow.

The characteristic feature of the method of the present invention is to provide a membrane for ultrafilter which does not have a dense layer, by using a non-volatile inorganic solvent. Such a membrane for ultrafilter could not have been obtained by conventional processes in which organic solvents are used.

Figure 4:
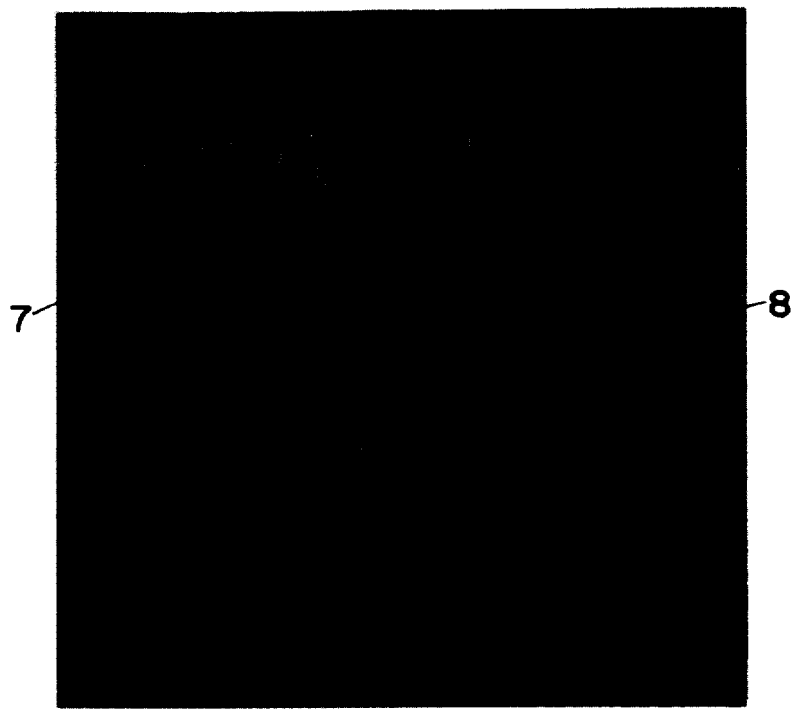

Referring now to the drawings, there are shown in FIGS. 1 – 4, microscopic photographs of cross-sections of representative membranes of the present invention. FIGS. 1 and 2 show a macro-structure, and FIGS. 3 and 4 show a micro-structure. FIG. 1 is an optical microscopic photograph of a cross-section vertical to the membrane, FIG. 2 is an optical microscopic photograph of a section parallel to the membrane, of the layer containing voids. FIG. 3 is a transmission type electron microscope photograph of a gradient type porous layer close to the surface of the membrane (2500 times of magnifying power). FIG. 4 is a transmission type electron microscope photograph of an ultra-thin cut piece of the same layer (12,500 times of magnifying power). In FIGS. 1 and 2, numeral 1 shows voids; numeral 2 shows the surface of the membrane; numeral 3 shows the back-surface of the membrane; and numeral 4 shows voids. In FIGS. 3 and 4, numerals 5 and 7 show the surface of the membrane and numerals 6 and 8 show voids.

The membranes of the present invention have a layer of about 5 to $10\mu$ on the surface side as shown in FIG. 1.

Adjacent to and in contact with this layer, there is a layer containing voids of a cylindrical shape having a substantially circular cross-section which are so specific that the diameters of the cross-section become greater, as the voids approach the back surface, but the voids do not penetrate the membrane to the back surface, as shown in FIG. 2. When viewed in micro, the layer containing voids consist of a body of a reticulate porous structure having pore diameters of about $0.1 - 0.5\mu$, as shown in FIGS. 3 and 4. Adjacent to and in contact with this layer, there is a surface porous structure which does not contain voids but the diameters of pores constituting the porous structure become smaller continuously as the pores approach the surface. This layer will be named hereinafter a gradient type porous layer. The diameters of pores contained in the gradient type layer are about $0.5\mu$ on the side close to the layer containing voids but they are in the order of 1000 A to several A at the surface part. The reason of the advantages of the ultrafilter according to the present invention, i.e. a large water-permeability and no occurrence of clogging, is believed to be due to the existence of the gradient type layer and the adjacent layer containing voids.

The above-mentioned is one example of the structure of the membranes of the present invention. Membranes of the present invention, however, are not limited to this example and naturally include variation in a certain range.

The gradient type porous layer occupies the surface part of the membrane of ultrafilter and has a thickness less than $100\mu$, preferably in the range of $30 - 1\mu$. When a number of planes existing at arbitrary distances apart from the surface are assumed, the average diameter of the pores existing in each plane becomes larger with the increase of distance from the surface of the membrane. It is $5\mu$ or less, preferably about $1\mu$ on the side close to the layer containing voids and less than 1000 A at the surface part.

The voids are parts of the membrane where the polymer constituting the membrane is deficient. They contain water in the wet state and air in the dry state. They have an ellipsoidal or cylindrical shape having their long axes in the direction perpendicular to the surfaces of the membrane. The sections perpendicular to the long axes of the voids are nearly circular. The lengths of the long axes are two times or more the diameters of the above-mentioned circular sections. So long as the voids have diameters of $5\mu$ or more and lengths of $10\mu$ or more, they are effective for the water-permeability of membrane. However, if the diameters exceed $50\mu$, the membrane loses its mechanical strength and hence its practical value.

Further, the lengths of the voids must be less than the thickness of the membrane. If they exceed the thickness of the membrane, one end or both the ends of the voids are open onto the surfaces of the membrane and the mechanical strength of the membrane is much reduced.

With regard to the thickness of the layer containing voids, there is no particular limitation but it is preferable that the voids do not penetrate the membrane in order that the strength of the membrane is maintained.

The recticulate porous structure is the one existing between each voids as shown in FIG. 4, but the size of the meshes is not limited to this size and all the sizes in the range of $0.1\mu$ to $5\mu$ are included in the range of the membrane of the present invention.

The ultrafilter according to the present invention has as extremely small a limit of molecular weight for filtration as 45,000 (about 30A), but, nevertheless, has a water-permeability greater than 0.2 ml/cm$^2$.min.atm. which is much larger than those of conventional ultrafilters.

The ultrafilters according to the present invention have, as shown in Examples, an extremely small limit of molecular weight for filtration, i.e. 45,000 (about 30A), and nevertheless, a much larger water-permeability than those of conventional membranes, i.e. greater than 0.2 ml/cm$^2$.min.atm.

A description will be made with regard to a method for producing membranes for ultrafilter.

It is necessary that the raw material polymers include 60% by mol or more of acrylonitrile, but acrylonitrile polymers containing 84 mol% or more of acrylonitrile units (or component) in the polymer chain are preferable. If the content of acrylonitrile units is less than 84% by mol, the solubility of the polymers in nitric acid is reduced and the viscosity of solution increases with the increase of comonomer units.

As comonomers, olefins such as isobutene, 1-hexene, etc.; halogenated olefins such as vinylidene chloride, vinyl chloride, etc.; diens such as butadiene, isobutene, etc.; esters such as methyl acrylate, ethyl acrylate, methyl methacrylate, vinyl acetate, etc.; aromatic compounds such as styrene, α-methyl styrene, etc.; nitriles such as methacrylonitrile, vinylidene cyanide, etc.; and the like, can be mentioned. Multi-component copolymers obtained by combinations of acrylonitrile with any of the above-mentioned comonomers are useful, but the molecular weight of polymers should be in the range of intrinsic viscosity of 0.4 to 3.0 as measured in N,N-dimethylformamide at 35°C in order to keep the sufficient mechanical properties and film-forming properties of dope.

As seen from the data of Examples, as the content of comonomer units increases, water-permeability increases, but mechanical strength of membranes begins to be reduced at about 14% by mol and is much reduced at about 16% by mol or more to such an extent as no more usable as a filter membrane.

As a solvent for a dope used for shaping membranes, nitric acid is most desirable and the nitric acid referred to herein includes all which are in the range of concentrations of its aqueous solution capable of dissolving acrylonitrile polymer. There are many solvents for polyacrylonitrile e.g. dimethylsulfoxide, N,N'-dimethylacetamide and the like, but, as shown by comparison in Examples, it is very difficult to obtain membranes for ultrafilter having a large water-permeability by solvents other than nitric acid.

It is preferable that the coagulation bath is a nitric acid having a concentration of 0 - 30% by weight, preferably water alone. As the concentration of the bath increases, a membrane having a high water-permeability can be scarcely obtained.

As seen from the data of Examples, the concentration of polymer in a dope should be adjusted to those in the range of 2 - 40% by weight, preferably in the range of 5 - 30% by weight.

Table 5 of Example 3 shows the relationship between polymer concentration and water-permeability, where when the concentration exceeds 40% by weight, water-permeability becomes very small.

Table 5 also shows the relationship between polymer concentration and mechanical strength of membrane. Strength is greatly reduced at about 5% by weight and is much reduced at about 2% by weight or less, to such an extent as no more usable as a filter membrane. Further, from the viewpoint of capability of film-shaping, a concentration lower than 2% by weight reduces the viscosity of solution too much and a concentration higher than 40% by weight increases the viscosity of solution too much to obtain a good quality membrane.

The dissolution of polymer in nitric acid should be carried out at a temperature of 0°C to −5°C and this temperature should be maintained during the time of filtration and defoaming. If a temperature of solution is elevated to a temperature higher than 0°C, during the time of dissolution, filtration and defoaming, polymers undergo drastic hydrolysis and membranes prepared from such a solution have a dense structure and notably reduced waterpermeability.

It is not preferable to apply such a stretching operation as those generally employed in common filmshaping process to the membranes during the step of filmshaping.

As for shaping methods for membranes, casting of a dope upon a plate, an endless belt or a revoling drum followed by immersion in a coagulation bath or extrusion of a dope from a slit directly into a coagulation bath can be employed.

It is also possible to prepare a membrane of ultrafilter on a supporting material such as cloth, porous plate, porous tube and they should be construed to be included in the membrane of the present invention.

Further a description will be made with regard to parameters referred to herein which show specific properties of the membranes for ultrafilter.

Water-permeability: (ml/cm$^2$.min.atm)

For the measurement of water-permeability, a common pressure-filtering apparatus designed so as to clamp a membrane through a packing material is used, and an amount of distilled water permeated for a unit period of time and per unit area was measured under a pressure difference of 1 atmosphere between a feed side and a flowout side.

Pore diameter:

Since pore diameters are extremely small they cannot be measured directly. Solutions of proteins having various sizes of spherical molecules were filtered with membranes and analyses were carried out with regard to filtrates in order to obtain a measure of pore diameters.

A list of spherical proteins used in Examples is shown in Table 3.

Table 3

| Spherical proteins for measuring pore-diameter | Molecular weight |
|---|---|
| γ-Globulin | 160,000 |
| Man serum albumen | 67,000 |
| Egg albumen | 45,000 |
| Pepsin | 35,000 |
| α-Chymotrypsin | 24,500 |
| Myoglobin | 17,800 |
| α-Lactoalbumen | 16,000 |
| Cytochrome-C | 13,000 |
| Insulin | 5,700 |
| γ-Bacitracin | 1,400 |

Filtration limit molecular weight: the least molecular weight of particles completely (100%) unable to pass through membranes of ultrafilter.

EXAMPLE 1

Polyacrylonitrile having an intrinsic viscosity of 1.2 as measured in N,N-dimethylformamide at 35°C was dissolved in an aqueous solution of nitric acid (65%) maintained at −5°C so as to give a concentration of 15 g/100 ml, and the resulting solution was filtered and defoamed while being maintained at −5°C. The resulting solution was uniformly cast on a glass plate by means of a knife coater to give a thickness of 0.3 mm. Immediately thereafter, the plate thus coated was dipped in a large amount of water to coagulate the solution. After coagulation, the resulting film was stripped from the glass surface and washed with water sufficiently. Then, the specific properties of the ultrafilter thus prepared was measured without drying to give a water-permeability 2.5 ml/cm$^2$.min.atm and a limit of molecular weight for filtration of 45,000. Further, pepsin was permeated in 100%.

FIG. 1 shows an optical microscope photo of a thin cut piece of the cross-section of the film perpendicular to the film surface. FIG. 2 shows an optical microscope photo of a cut piece of a surface parallel to the film surface, of a voids-containing layer. FIG. 3 shows a photograph of transmission type electron microscope (2,500 times) of an ultra-thin cut piece in the vicinity of the surface of the film. FIG. 4 shows a further enlarged one (12,500 times) thereof.

In FIG. 1, numeral 1 shows voids; numeral 2, the surface of film; and numeral 3, the back surface of film. In FIG. 3, numeral 4 shows voids. In FIGS. 3 and 4, numerals 5 and 7 show the surface of film; and numerals 6 and 8 show voids.

This film has a gradient type porous layer having a thickness of about 6μ, in the part of surface, and further, in contact therewith, a network porous layer (the size of the network: about 0.5μ) containing therein voids having diameters of 10 - 30μ and lengths of 20 - 200μ. The voids are regularly disposed perpendicularly to the film and have an effective structure for increasing water-permeability. The thickness of the film is 270μ.

In the same manner as the above-mentioned, with acrylonitrile copolymers containing various contents of methylacrylate units as comonomer ones (intrinsic viscosity as measured in N,N-dimethylformamide at 35°C; 2.5 – 0.4), the respective films were prepared using an aqueous solution of nitric acid, and their specific properties were measured to give the following results shown in Table 4.

Table 4

| Content of comonomer (% by mol) | Thickness of film ($\mu$) | Specific properties of films of Example 1 | | | Water-permeability (ml/cm². min·atm) | Limit of molecular weight for filtration | Tensile strength (kg/cm²) |
|---|---|---|---|---|---|---|---|
| | | Thickness of gradient type porous layer ($\mu$) | Size of voids ($\mu$) | | | | |
| | | | diameter | length | | | |
| 0 | 270 | 6 | 10–30 | 20–200 | 2.5 | 45,000 | 25.0 |
| 1 | 270 | 6 | 10–30 | 20–200 | 3.2 | 45,000 | 25.3 |
| 8 | 270 | 6 | 10–30 | 20–200 | 8.3 | 45,000 | 26.0 |
| 12 | 270 | 5 | 10–30 | 20–200 | 11.1 | 45,000 | 24.0 |
| 14 | 270 | 5 | 10–30 | 20–200 | 12.6 | 45,000 | 18.2 |
| 16 | 270 | 4 | 10–30 | 20–200 | 14.0 | 45,000 | 10.0 |

As seen from the Table, with the increase of content of comonomer, the water-permeability is increased, but the meachnical strength is reduced. At a content thereof above 16%, only a product having an inssufficient strength as filter could be obtained.

EXAMPLE 2

An acrylonitrile copolymer containing 1% by mol of methacrylonitrile (intrinsic viscosity as measured in N,N-dimethylformamide; 1.5) was subjected to film-making in the same manner as in Example 1 to give an ultrafilter having a water-permeability of 3.4 ml/cm².min.atm and a limit of molecular weight for filtration of 45,000. Pepsin was permeated by 100%.

EXAMPLE 3

An acrylonitrile copolymer containing 8% by mol of methyl methacrylate (intrinsic viscosity as measured in N,N-dimethylformamide: 1.7) was subjected to film-making in the same manner as in Example 1, to investigate the relationship between concentration of solution and specific properties of ultrafilter. The results are shown in Table 5.

Table 5

| Concentration of spinning solution (% by weight) | Thickness of film ($\mu$) | Specific properties of film of Example 3 | | | Water-permeability (ml/cm² min·atm) | Limit of molecular weight for filtration | Tensile strength |
|---|---|---|---|---|---|---|---|
| | | Thickness of gradient type porous layer ($\mu$) | Size of voids ($\mu$) | | | | |
| | | | diameter | length | | | |
| 2 | 240 | 4 | 10–30 | 20–200 | 15.3 | 45,000 | 9.3 |
| 5 | 250 | 5 | 10–30 | 20–200 | 14.1 | 45,000 | 20.1 |
| 10 | 270 | 6 | 10–30 | 20–200 | 10.7 | 45,000 | 27.0 |
| 15 | 270 | 7 | 10–30 | 20–200 | 8.1 | 45,000 | 31.8 |
| 20 | 270 | 7 | 10–30 | 20–200 | 5.0 | 45,000 | 38.0 |
| 30 | 280 | 7 | 10–30 | 20–200 | 2.7 | 45,000 | 50.5 |
| 40 | 280 | 7 | 10–30 | 20–200 | 0.1 | 45,000 | 65.2 |

If the concentration of spinning solution is below 2%, the mechanical strength of a membrane is extremely reduced, while if it exceeds 40%, the water-permeability is also extremely reduced, whereby the resulting product cannot be used as filter.

EXAMPLE 4

An acrylonitrile copolymer containing 8% by mol of methyl acrylate units (intrinsic viscosity: 1.7) was dissolved in the same manner as in Example 1, and the resulting solution was subjected to film-making but only concentrations of nitric acid of the coagulation bath. were varied. The specific properties of the resulting ultrafilters are shown in Table 6.

Table 6

| Nitric acid concentration of coagulation bath (%) | Thickness of film ($\mu$) | Specific properties of film of Example 4 | | | Water-permeability (ml/cm² min. atm) | Limit of molecular weight for filtration |
|---|---|---|---|---|---|---|
| | | Thickness of gradient type porous layer ($\mu$) | Size of voids ($\mu$) | | | |
| | | | diameter | length | | |
| 0 | 270 | 6 | 10–30 | 20–200 | 8.1 | 45,000 |
| 10 | 270 | 9 | 10–30 | 20–200 | 3.4 | 45,000 |
| 20 | 270 | 14 | 10–30 | 20–200 | 1.5 | 45,000 |
| 30 | 260 | 20 | 10–30 | 20–200 | 0.7 | 45,000 |

As seen from Table 6, with the increase of nitric acid concentration of coagulation bath, the thickness of the gradient type porous layer is increased while the water-permeability is reduced.

COMPARATIVE EXAMPLES

Film-making was carried out in the same manner as in Example 1 except that N,N-dimethylsulfoxide was used as the solvent for polymer solution. The results are shown in Table 7.

As seen from Table 7, the films prepared by the use of N,N-dimethylsulfoxide as solvent have neither gradient type porous layer nor voids, and also their water-permeabilities are small.

Further, film-making was carried out in the same manner as in Example 1, by the use of N,N-dimethylacetamide, and the specific properties of the resulting films were measured. The results are shown in Table 8.

Table 7

Specific properties of ultrafilter according to N,N-dimethylsulfoxide process (comonomer: methyl acrylate)

| Content of comonomer (% by mol) | Thickness of film ($\mu$) | Gradient type porous layer | Voids | Water-permeability (ml/cm². min·atm) | Limit of molecular weight for filtration | Tensile strength (kg/cm²) |
|---|---|---|---|---|---|---|
| 0 | 270 | no | no | 0.31 | 45,000 | 23.0 |
| 1 | 270 | '' | '' | 0.23 | 45,000 | 23.2 |
| 8 | 270 | '' | '' | 0.01 | — | 24.1 |
| 12 | 270 | '' | '' | 0.001 | — | — |
| 14 | 270 | '' | '' | <0.0001 | — | — |
| 16 | 270 | '' | '' | <0.0001 | — | — |

Table 8

Specific properties of ultrafilters according to N,N-dimethylacetamide process (comonomer: methyl acrylate)

| Content of comonomer (% by mol) | Thickness of film ($\mu$) | Gradient type porous layer | Voids | Water-permeability (ml/cm²·min. atm) | Limit of molecular weight for filtration | Tensile strength (kg/cm²) |
|---|---|---|---|---|---|---|
| 0 | 270 | no | no | 0.30 | 45,000 | 23.1 |
| 1 | 270 | '' | '' | 0.21 | 45,000 | 23.5 |
| 8 | 270 | '' | '' | 0.01 | — | 23.8 |

As seen from the Table, the films prepared by the use of N,N-dimethylacetamide as solvent, also have neither gradient type porous layer nor voids, and the water-permeabilities are also small.

As shown in these Comparative Examples, in the cases of the ultrafilters prepared according to N,N-dimethylsulfoxide process or N,N-dimethylacetamide process, the water-permeabilities are reduced with the increase of the content of comonomer, whereas the ultrafilters prepared according to nitric acid process show an entirely opposite tendency that the water-permeability is increased with the increase of the content of comonomer. Further, the water-permeabilities of the films prepared according to nitric acid process are 10 - several tens times those according to N,N-dimethylsulfoxide process or N,N-dimethyl-acetamide process.

EXAMPLES 5 – 14

Film-making was carried out in the same manner as in Example 1, with various kinds of copolymers. The specific properties of the resulting films are shown in Table 9.

Table 9

Specific properties of films of Examples 5 – 14

| Example No. | Composition of copolymer (ratio by mol) | Thickness of film ($\mu$) | Thickness of gradient type porous layer ($\mu$) | Size of voids ($\mu$) diameter | Size of voids ($\mu$) length | Water-permeability (ml/cm²·min. atm) | Limit of molecular weight for filtration |
|---|---|---|---|---|---|---|---|
| 5 | Acrylonitrile (AN)-isobutene (98:2) | 270 | 6 | 10–30 | 20–200 | 2.1 | 45,000 |
| 6 | AN-ethyl vinylether (98:2) | 270 | 6 | 10–30 | 20–200 | 1.8 | 45,000 |
| 7 | AN-vinylidene chloride (68:32) | 270 | 6 | 10–30 | 20–200 | 12.1 | 45,000 |
| 8 | AN-butadiene (99:1) | 270 | 6 | 10–30 | 20–200 | 2.5 | 45,000 |
| 9 | AN-styrene (98:2) | 270 | 6 | 10–30 | 20–200 | 1.4 | 45,000 |
| 10 | AN-methacrylonitrile (60:40) | 270 | 6 | 10–30 | 20–200 | 13.0 | 45,000 |
| 11 | AN-acrylamide (90:10) | 270 | 6 | 10–30 | 20–200 | 0.9 | 45,000 |
| 12 | AN-dimethyl-acrylamide (90:10) | 270 | 6 | 10–30 | 20–200 | 7.7 | 45,000 |
| 13 | AN-acrylic acid (80:20) | 270 | 6 | 10–30 | 20–200 | 8.3 | 45,000 |
| 14 | AN-acrylic acid-methylacrylate (91:8:1) | 270 | 6 | 10–30 | 20–200 | 1.5 | 45,000 |

EXAMPLES 15 – 18

An acrylonitrile copolymer containing 8% by mol of methyl acrylate units (intrinsic viscosity as measured in dimethylformamide: 1.6) was subjected to film-making in the same manner as in Example 1, except that the nitric acid concentration of dope was varied from 62% to 90%. The specific properties of the resulting films are shown in Table 10. As shown in the Table, the mechanical strength was best in the vicinity of 68%.

Table 10

Specific properties of films of Examples 15 – 18

| Example No. | Nitric acid concentration of spinning solution (%) | Thickness of film ($\mu$) | Thickness of gradient type porous layer ($\mu$) | Size of voids ($\mu$) diameter | Size of voids ($\mu$) length | Water-permeability (ml/cm$^2$·min·atm) | Limit of molecular weight for filtration | Tensile strength (kg/cm$^2$) |
|---|---|---|---|---|---|---|---|---|
| 15 | 62 | 270 | 6 | 10–30 | 20–200 | 7.1 | 45,000 | 20.3 |
| 16 | 68 | 270 | 6 | 10–30 | 20–200 | 7.2 | 45,000 | 26.1 |
| 17 | 73 | 270 | 6 | 10–40 | 20–200 | 6.8 | 45,000 | 19.7 |
| 18 | 90 | 270 | 6 | 10–50 | 20–200 | 7.1 | 45,000 | 16.9 |

EXAMPLE 19

Polyacrylonitrile having an intrinsic viscosity of 1.8 as measured in N,N-dimethylformamide was dissolved in an aqueous solution of nitric acid (70%) maintained at −5°C, to give a solution having a concentration of 15g/100 ml, which was then filtered and defoamed while being maintained at −5°C. The resulting solution was extruded from a slit having a width of 5 cm and a gap distance of 0.2 mm and dipped in water as a coagulation bath to give a membrane. The membrane thus prepared had a water-permeability of 1.3 ml/cm$^2$.min..atm, a limit of molecular weight for filtration of 45,000 and a gradient-type porous layer on each surface, each layer having a thickness of 6$\mu$. The voids contained therein had diameters of 10–30$\mu$ and lengths of 20–200$\mu$.

What is claimed is:

1. Membranes of acrylonitrile polymers for ultrafilter, comprising:

1. a porous layer or layers existing near and on at least one of the surfaces of said membranes, the average sizes of pores contained in said porous layer or layers and existing on each of assumptive parallel planes to the surfaces of said membranes, having a gradient in that said average sizes become smaller toward the surfaces of said membranes, and 2. a reticulate porous layer adjacent to said porous layer or layers (1) and containing therein a succession of voids of cylindrical shape or revolving ellipsoid shape having diameters of 5 – 50 $\mu$ and lengths of at least 10 $\mu$ and less than the thickness of said membranes, said membranes being prepared by dissolving an acrylonitrile polymer containing at least 84% by weight of acrylonitrile units in a solution of nitric acid having a concentration of 65–95% by weight, extruding the resulting solution, introducing the resulting extrudate into a solidifying bath consisting of water or an aqueous solution of nitric acid having a concentration of 30% by weight or less.

2. Membranes of acrylonitrile polymers for ultrafilter according to claim 1 wherein said extruding is carried out from a die onto a support to cast said resulting solution thereon.

3. Membranes of acrylonitrile polymers for ultrafilter according to claim 2 wherein said support is a flat plate.

4. Membranes of acrylonitrile polymers for ultrafilter according to claim 2 wherein said support is an endless belt.

5. Membranes of acrylonitrile polymers for ultrafilter according to claim 2 wherein said support is a porous one.

6. Membranes of acrylonitrile polymers for ultrafilter according to claim 1 wherein said extruding is carried out by means of a linear form slit.

* * * * *